UNITED STATES PATENT OFFICE.

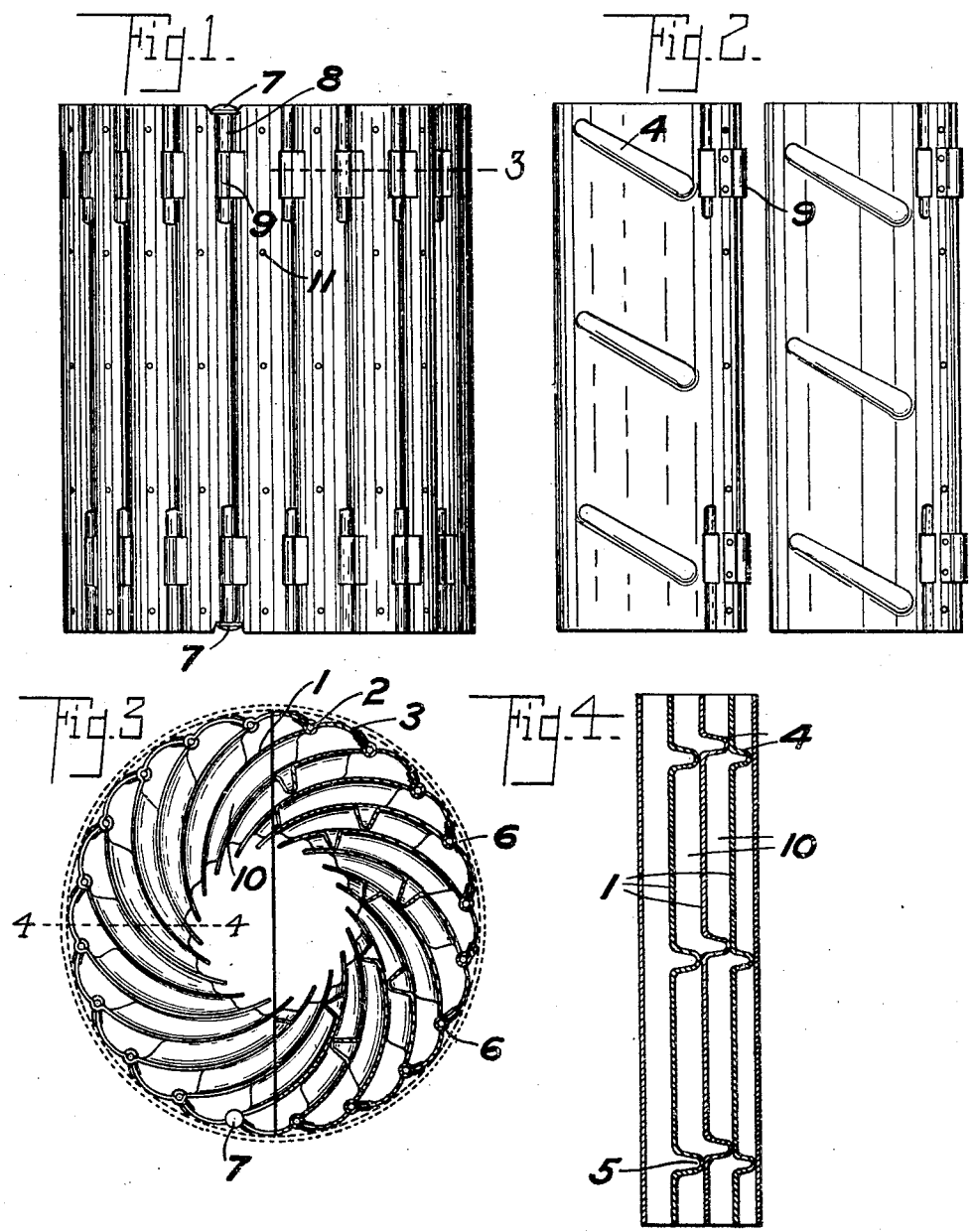

EDGAR W. BROOMALL, OF ROCHESTER, NEW YORK.

CENTRIFUGAL CREAM-SEPARATOR.

No. 809,355.　　　　Specification of Letters Patent.　　　　Patented Jan. 9, 1906.

Application filed May 22, 1905. Serial No. 261,699.

*To all whom it may concern:*

Be it known that I, EDGAR W. BROOMALL, a citizen of the United States, and a resident of Rochester, in the county of Monroe and State of New York, have invented certain new and useful Improvements in Centrifugal Cream-Separators, of which the following is a specification.

This invention relates to centrifugal cream-separators, and particularly to that class that employ vertical division-blades in their separating-bowls.

The object of the invention is to separate from the milk such cream as remains in it when it reaches the wall of the bowl after passing between the blades from the center of the bowl.

In the drawings, Figure 1 is a side view of the division-blades. Fig. 2 is an inside view of two adjacent blades. Fig. 3 is a cross-section on the line 3 3 of Fig. 1, and Fig. 4 is a vertical section on the line 4 4 of Fig. 3.

In the drawings the division-blades 1 are represented as curved, so that when they are in place in the bowl they intersect its radial lines, although it is not essential to the invention that they should be so shaped. The blades are represented as pivotally attached to one another at their outer ends, as by hinges 2 at their outer edges, so that they can be folded up into cylindrical form and inserted within the bowl, their free ends extending inwardly toward the center of the bowl; but other suitable means may be employed for supporting the blades within the bowl in proper relative positions, according to the form of blades adopted and what is required of them. Cream-collecting plates 3 cut the radial lines of the bowl adjacent to its wall, but leaving space between them and the wall for milk to circulate. In the drawings these cream-collecting plates are represented as integral with the division-blades 1 and are formed by bending said division-blades inwardly from their curve in the opposite direction from that in which the bowl rotates. The cream-collecting plates 3 thus formed lie adjacent to the surface of the bowl when the blades are in place within it and cut the radial lines of the bowl. The hinges 2 on the edges of the blades or equivalent pivotal connections are attached to the adjacent blades, respectively, back of the bent portions that constitute the cream-collecting plates 3. The blades are shown with ribs that extend diagonally along their inner surfaces from the outer hinged end of the blades upwardly toward the free inner ends. These ribs serve a dual purpose. They both space the blades—that is, retain them at their proper distances apart while under centrifugal force to make passages between them for the milk—and they also serve as guides for the cream to conduct it inwardly. In the drawings the blades are represented as having three of these ribs each, and the ribs are represented as raised upon the surfaces of the blades by stamping. When the ribs are stamped upon the blades in this manner, they must not lie directly opposite to each other, so that they will nest together, but should be placed up and down alternately along the blades, so that each rib 4 will come at one side or the other of a recess 5, after the manner in which they are arranged in Figs. 2 and 4.

When the cream-collecting plates 3 are in place within the bowl, which is represented by dotted lines in Fig. 3, vertical compartments 6 are formed between the lines along which the arched cream-collecting plates contact the wall of the bowl. If curved division-blades like those shown are used and such blades are hinged together and folded up, as shown in Fig. 3, they will expand under the centrifugal force developed by the rapid revolution of the bowl, and the outer ends of blades will engage the wall of the bowl and tend to straighten out at their curved portions 3, so that these will lie against the wall of the bowl, in which case the vertical passages 6 will be eliminated. To prevent this and preserve the vertical passages 6, the cylindrical system of blades is locked together by suitable means when folded up in the manner shown in Fig. 3. In the drawings pins 7 are shown as the locking means, which lie in rings 8 and 9 on the open ends, respectively, of the system of blades. This locking device is shown at both the top and the bottom of the blades. In operation the unskimmed milk is thrown outward from the center of the bowl by reason of the centrifugal force developed by the revolution of the bowl in the usual manner, passing through the spaces 10 between the division-blades 1. As the cream is separated from the milk and passes inwardly the ribs 4 direct its course. When the milk reaches the outer ends of the spaces 10, where the cream-collecting plates are placed, most of the cream will have been separated from it; but a considerable amount of cream still remains in the milk. This cream is ordinarily lost in separators of this type by passing out of the separator with the milk, and it is the object of this invention to save it. Since the centrifugal force is greatest at this point and the cream-collecting plates 3 cut the radial lines of the bowl, they are well adapted to collect the cream that remains in the milk when it reaches the outer part of the bowl.

The cream-collecting plates 3 are perforated, as at 11, throughout their length, so that the milk passes from the spaces 10 into the vertical passages 6 around the wall of the bowl. In these passages 6 the cream is separated from the milk by the centrifugal force, the milk passing upward along the wall of the bowl and the cream collecting on the outer surfaces of the cream-collecting plates 3. The cream that collects on the inner surfaces of the cream-collecting plates 3 passes over them in the direction opposite to that of rotation and passes onto the adjacent division-blades, respectively, which conduct it back into the bowl. The cream that collects on the outer surfaces of these cream-collecting plates passes over them in the same direction to the same division-blades, respectively, whence it passes inwardly beneath the edge of the cream-collecting plates and joining the cream from the inner surface of the cream-collecting plates 3 passes inwardly.

What I claim is—

1. In a centrifugal cream-separator, the combination with a rotary bowl, of a series of vertical, cream-collecting plates that intersect the radial lines of the bowl adjacent to its wall, leaving space for milk between said plates and said wall, said plates having passages through which the milk can pass to the wall of the bowl; and division-blades adjacent to said cream-collecting plates, adapted to receive the cream from both sides of said plates and to conduct it inwardly.

2. In a centrifugal cream-separator, the combination with a rotary bowl, of a series of division-blades having angular portions that intersect the radial lines of the bowl adjacent to its wall and leave space for milk between such portions and the wall of the bowl, said blades having passages for the milk to pass to the wall of the bowl from the spaces between said blades, each of said angular portions of said blades approaching another blade whereby cream is delivered from both of its sides to such other blade to be conducted inwardly thereby.

3. In a centrifugal cream-separator, the combination with a rotary bowl, of a series of vertical, cream-collecting plates that intersect the radial lines of the bowl and form a series of vertical compartments for milk between them and the wall, said plates having passages through which milk can pass to said vertical channels; and division-blades adjacent to said cream-collecting plates, adapted to receive the cream from both sides of said plates and to conduct it inwardly.

EDGAR W. BROOMALL.

Witnesses:
D. GURNEE,
L. THON.